US008980145B2

(12) United States Patent
Baroux

(10) Patent No.: US 8,980,145 B2
(45) Date of Patent: Mar. 17, 2015

(54) METHOD FOR FORMING A FIRE RESISTANT CELLULOSE PRODUCT

(71) Applicant: BLH Technologies Inc., Halifax (CA)

(72) Inventor: Daniel Baroux, Nova Scotia (CA)

(73) Assignee: BLH Technologies, Inc., Halifax, Nova Scotia (CA)

(\*) Notice: Subject to any disclaimer, the term of this patent is extended or adjusted under 35 U.S.C. 154(b) by 61 days.

(21) Appl. No.: 13/940,875

(22) Filed: Jul. 12, 2013

(65) Prior Publication Data

US 2013/0300015 A1 Nov. 14, 2013

Related U.S. Application Data

(63) Continuation of application No. PCT/CA2011/050013, filed on Jan. 13, 2011.

(51) Int. Cl.
*B29C 43/00* (2006.01)
*B27N 9/00* (2006.01)
*D06M 11/00* (2006.01)

(52) U.S. Cl.
CPC .............. *B29C 43/003* (2013.01); *B27N 9/00* (2013.01); *D06M 11/00* (2013.01)
USPC ........................... 264/40.1; 264/115; 264/330

(58) Field of Classification Search
CPC ........ B27N 9/00; B29C 43/003; D06M 11/00
USPC .................. 264/115, 330, 40.1; 425/145, 200
See application file for complete search history.

(56) References Cited

U.S. PATENT DOCUMENTS

| 3,383,274 A * | 5/1968 | Craig ........................... 428/326 |
| 4,063,883 A | 12/1977 | Hupfl et al. |
| 4,595,414 A | 6/1986 | Shutt |
| 4,755,225 A | 7/1988 | Pruitt |
| 5,008,359 A | 4/1991 | Hunter |
| 5,418,282 A | 5/1995 | Wiehn |
| 5,434,200 A * | 7/1995 | Kolker et al. .................. 524/35 |
| 5,880,243 A | 3/1999 | Park et al. |
| 6,617,382 B1 | 9/2003 | Pirig et al. |
| 2002/0150758 A1 | 10/2002 | Prieto |
| 2004/0028958 A1 | 2/2004 | Assink et al. |
| 2004/0132871 A1 | 7/2004 | Jones et al. |
| 2008/0171231 A1 | 7/2008 | Lopez et al. |
| 2009/0068430 A1 | 3/2009 | Troger et al. |
| 2010/0261397 A1 | 10/2010 | Sabourin et al. |

FOREIGN PATENT DOCUMENTS

| CA | 2039634 A1 | 10/1991 |
| EP | 0 735 187 A1 | 10/1996 |

\* cited by examiner

*Primary Examiner* — Jill Heitbrink
(74) *Attorney, Agent, or Firm* — Womble Carlyle Sandridge & Rice, LLP

(57) ABSTRACT

A method is provided for forming a fire resistant cellulose material. Such a method comprises processing cellulose fibers into a fiber mixture, and then forming a wetted mixture from the fiber mixture and a fire-retarding solution, wherein the wetted mixture has a solids content of the fire-retarding solution substantially uniformly and thoroughly dispersed therethrough. In some aspects, a cohesive mixture may be formed from the wetted mixture and a binding agent, and the cohesive mixture then formed into a formed cellulose product. An associated apparatus is also provided.

17 Claims, 2 Drawing Sheets

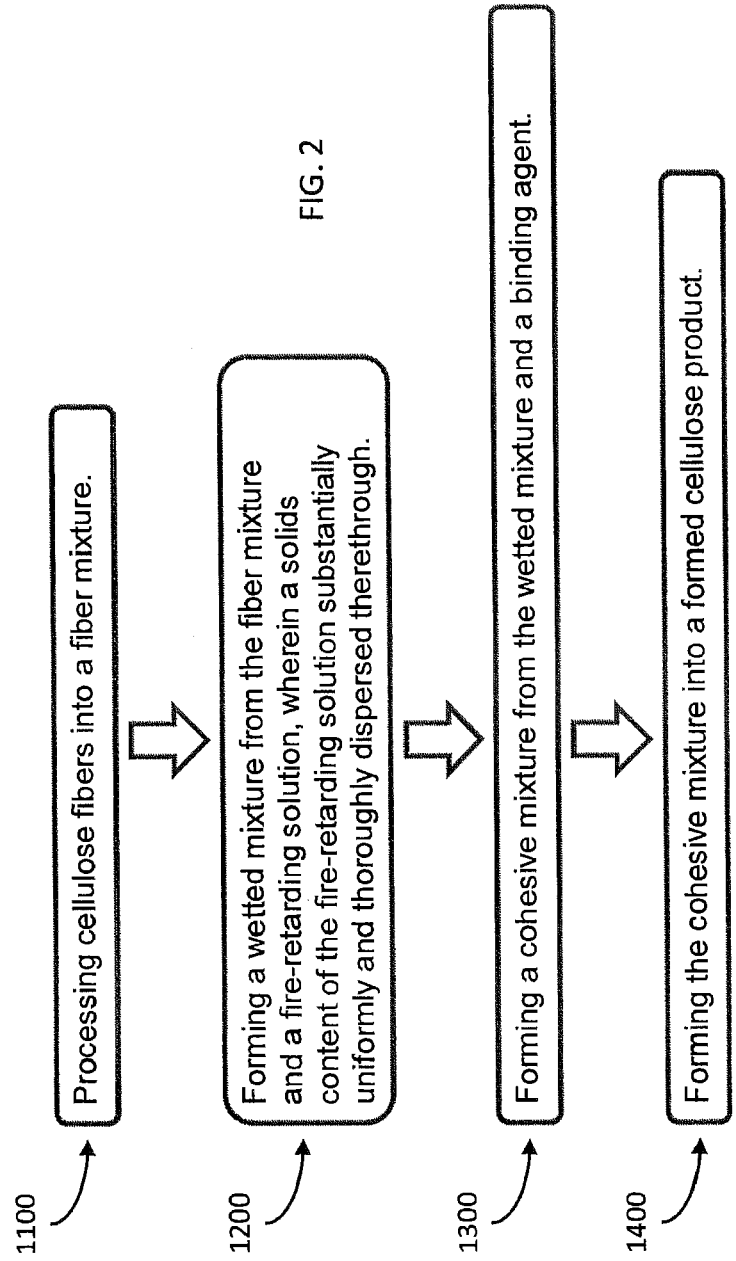

METHOD FOR FORMING A FIRE RESISTANT CELLULOSE PRODUCT

CROSS-REFERENCE TO RELATED APPLICATIONS

Figure 1:
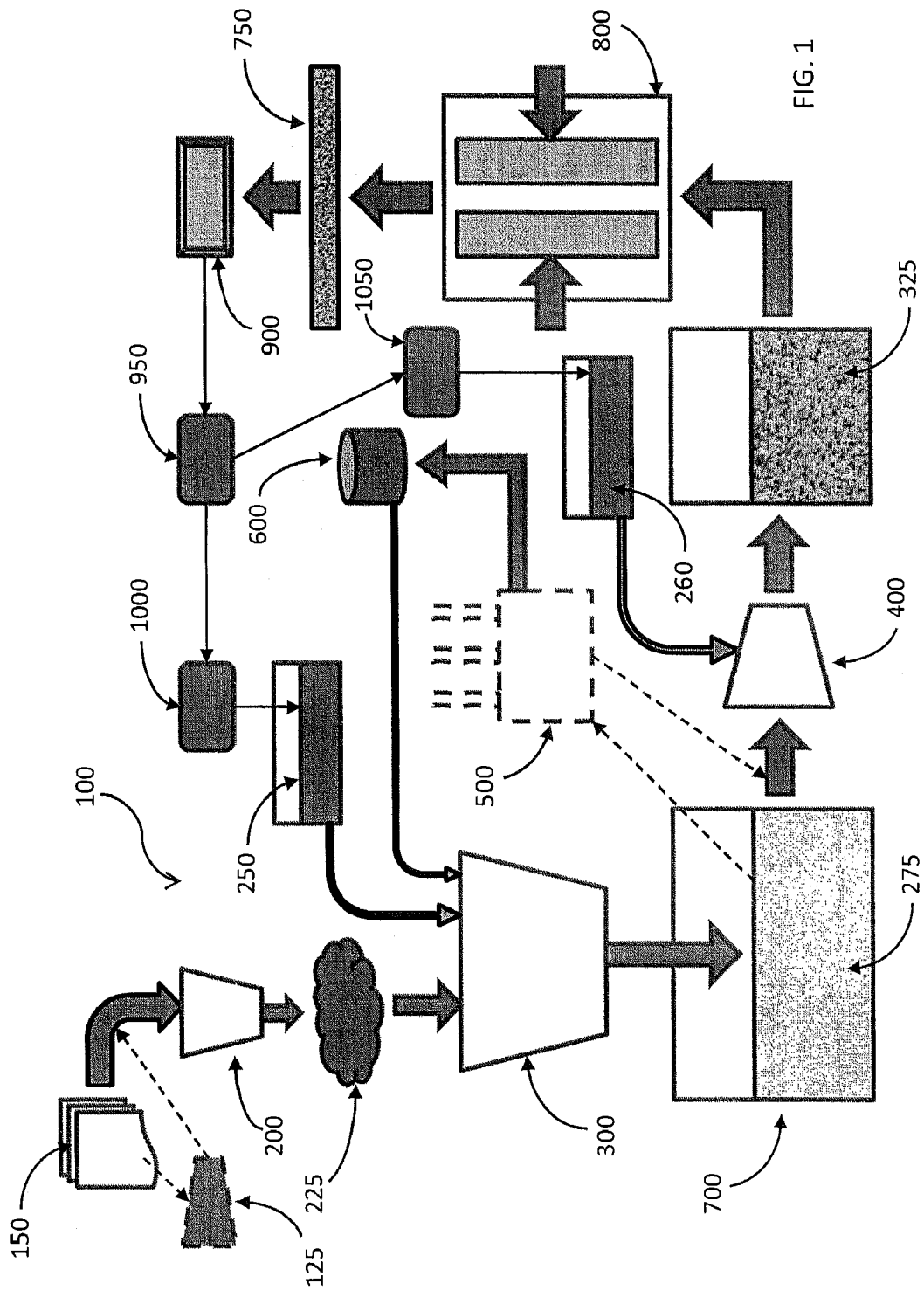

This application is a continuation application of PCT/CA2011/050013 filed Jan. 13, 2011, which International Application was published by the International Bureau in English on Jul. 19, 2012, which is hereby incorporated herein in its entirety by reference.

BACKGROUND OF THE DISCLOSURE

1. Field of the Disclosure

Aspects of the present disclosure relate to methods for forming fire resistant products, and, more particularly, to a method for forming a fire resistant or otherwise ignition resistant cellulose product, and associated apparatus.

2. Description of Related Art

It may sometimes be desirable for particular products to exhibit resistance to fire. For example, it may be desirable for cellulose fiber-based board products used in building construction to exhibit a certain degree of fire resistance. In some instances, a cellulose fiber-based board product may have a fire-retardant product applied thereto, post-formation, to provide some fire resistance capabilities for the cellulose fiber-based board product. That is, an exemplary as-formed cellulose fiber-based board product may have a surface treatment, for example, a liquid fire retardant, applied thereto in order for the treated product to exhibit at least some fire resistance. In such instances, however, one possible limitation in the treatment of the as-formed cellulose fiber-based board product for fire resistance, particularly with a liquid fire retardant, is achieving an even and consistent treatment of that product. More particularly, the result of some fire resistance treatment processes involving application of a liquid fire-retardant to an as-formed cellulose fiber-based board product may be an uneven or otherwise inconsistent coverage of the fire retardant with respect to the product. In those cases, the uneven treatment may result in varying levels of fire resistance of the treated cellulose fiber-based board product which may, in turn, become a hazard in the event of a fire which the product is intended to retard or otherwise provide some resistance. Further, such treatment processes may not necessarily be efficient in terms of applying the fire retardant to the cellulose fiber-based board product, may not include provisions for capturing or recycling excess portions of the fire retardant product, and may not have the capability for preventing or restricting losses of the fire retardant due, for instance, to evaporative processes.

Thus, there exists a need for a process and associated apparatus for evenly and consistently applying a fire retardant, particularly a liquid fire retardant, to a cellulose product such as, for example, a cellulose fiber-based board product. In some instances, it may be desirable to form an integral cellulose product having enhanced characteristics and physical properties over an existing product, while also providing an enhanced level of fire resistance. It may also be desirable, in some instances, to have a cellulose fiber-based board formation process with the capability of capturing excess fire retardant and recycling the captured excess in subsequent cellulose product manufacturing cycles, whether the excess is captured in a liquid form or in other forms, such as vapors.

BRIEF SUMMARY OF THE DISCLOSURE

The above and other needs are met by aspects of the present disclosure, wherein one such aspect relates to a method of forming a fire resistant cellulose material. Such a method comprises processing cellulose fibers into a fiber mixture, and then forming a wetted mixture from the fiber mixture and a fire-retarding solution, wherein the wetted mixture has a solids content of the fire-retarding solution substantially uniformly and thoroughly dispersed therethrough. In some instances, such a method may further comprise forming a cohesive mixture from the wetted mixture and a binding agent, and then forming the cohesive mixture into a formed cellulose product. In further instances, forming a cohesive mixture may be performed substantially concurrently with forming a wetted mixture. In yet other instances, such a method may include de-liquefying the wetted mixture to form a dry fire-retarding fiber mixture, such that forming a cohesive mixture involves forming a cohesive mixture from the dry fire-retarding fiber mixture and a binding agent.

Another aspect of the present disclosure relates to an apparatus for forming a fire resistant cellulose material. Such an apparatus comprises a first processing device configured to process cellulose fibers into a fiber mixture, and a first mixing device configured to form a wetted mixture from the fiber mixture and a fire-retarding solution, wherein the wetted mixture has a solids content of the fire-retarding solution substantially uniformly and thoroughly dispersed therethrough. In some instances, such an apparatus may further comprise a second mixing device configured to form a cohesive mixture from the wetted mixture and a binding agent, and a forming device configured to form the cohesive mixture into a formed cellulose product. In further instances, the first mixing device and the second mixing device are configured to substantially concurrently form the wetted mixture and form the cohesive mixture. In yet other instances, a second processing device may be configured to de-liquefy the wetted mixture to form a dry fire-retarding fiber mixture, wherein the second mixing device is configured to form a cohesive mixture from the dry fire-retarding fiber mixture and a binding agent.

In some instances, the wetted mixture may be maintained for at least a predetermined time, so as to allow the fire-retarding solution to be at least partially absorbed by the cellulose fibers in the fiber mixture, prior to de-liquefying the wetted mixture or forming the cohesive mixture.

In some aspects, the fire-retarding solution may be an aqueous fire-retarding solution. It may be preferred that the fire-retarding solution be nontoxic and/or have a neutral pH and/or be hypoallergenic and/or have any number of otherwise desirable properties. In some aspects, the fire-retarding solution may comprise any one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, or various combinations thereof.

In still further aspects, the first processing device may be configured to process raw wood pulp, palm tree waste, waste fiber, waste paper, and waste board, each comprising cellulose fibers, into the fiber mixture. Further, the first mixing device may be configured, for example, to form the wetted mixture by substantially saturating the fiber mixture with the fire-retarding solution having a first concentration of the solids content and/or forming a slurry from the fiber mixture and the fire-retarding solution.

In further aspects, the second processing device may be configured to dewater the wetted mixture and to dry the dewatered wetted mixture to form the dry fire-retarding fiber mixture. In doing so, the wetted mixture may also be heated to facilitate the formation of the dry fire-retarding fiber mixture. Further, in some instances, moisture may be added to the dry fire-retarding fiber mixture, such that the dry fire-retarding fiber mixture has a moisture content of between about 1% and about 20%, prior to forming the cohesive mixture.

In yet other aspects, the apparatus may also comprise a recovery device configured to recover excess fire-retarding solution, in one of a liquid and a vapor form, from the second processing device, upon the second processing device deliquefying the wetted mixture to form the dry fire-retarding fiber mixture. Further, the recovery device may be configured to direct the recovered excess fire-retarding solution to the first mixing device, to be added to the fiber mixture to form the wetted mixture, for example, in a closed-loop, fire-retarding solution recycling process.

Also, in other aspects, the second processing device may be configured to form a cohesive mixture from the dry fire-retarding fiber mixture and a binding agent comprising one of a resin material and an adhesive material, and the forming device may be configured to compress the cohesive mixture to form a densified cellulose product, extrude the cohesive mixture to form the formed cellulose product, or mold the cohesive mixture to form the formed cellulose product. In doing so, the cohesive mixture may be formed into one of an oriented strand board cellulose product, a medium density fiber board cellulose product, a particle board cellulose product, and an insulation board cellulose product.

Further, upon forming the cellulose product, the internal bond strength can be evaluated and compared to an acceptable internal bond strength for the formed cellulose product. If the evaluated internal bond strength is less than the acceptable internal bond strength, the fire-retarding solution used to form the wetted mixture may be diluted, or an amount of the binding agent used to form the cohesive mixture may be increased.

Aspects of the present disclosure thus address the identified needs and provide other advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 schematically illustrates an apparatus for forming a fire resistant cellulose product, according to one aspect of the disclosure; and FIG. 2 schematically illustrates a method of forming a fire resistant cellulose product, according to one aspect of the disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure are generally directed to apparatuses and methods for forming a fire resistant cellulose product. As previously discussed, one possible limitation in the treatment of as-formed cellulose products, such as a cellulose fiber-based board product, for fire resistance, particularly with a liquid fire retardant, is achieving an even and consistent treatment of that cellulose product. That is, the result of some fire resistance surface-treatment processes may be an uneven, non-uniform, or otherwise inconsistent or incomplete application of the fire retardant to the cellulose product. In those cases, such uneven surface treatment may result in varying levels of fire resistance of the treated cellulose product which may, in turn, become a hazard in the event of a fire which the product is intended to retard or otherwise provide some resistance.

As such, one aspect of the present disclosure involves an apparatus for forming a fire-resistant cellulose product, such an apparatus being indicated as element 100 in FIG. 1. Such an apparatus 100 may comprise, for example, a first processing device 200 configured to process cellulose fibers from a cellulose fiber source 150 into a fiber mixture 225, a first mixing device 300 configured to form a wetted mixture 275 from the fiber mixture 225 and a fire-retarding solution 250, such that the wetted mixture 275 has a solids content of the fire-retarding solution 250 substantially uniformly and thoroughly dispersed therethrough. A second mixing device 400 is configured to form a cohesive mixture 325 from the wetted mixture 275 and a binding agent 325, and a forming device 700 is configured to form the cohesive mixture 325 into a formed cellulose product 750.

The first processing device 200 may be configured to process cellulose fibers from one or more sources 150 into the fiber mixture 225. That is, though aspects of the present disclosure contemplate that the cellulose products may be comprised of recycled cellulose fibers (i.e., from palm tree waste, empty fruit bunches, sugar can waste, bagasse, waste fiber, waste paper, waste board, waste paperboard, or any other suitable waste source of cellulose fibers), one skilled in the art will appreciate that raw, original, or otherwise virgin cellulose fibers (i.e., raw wood pulp) may also be used in addition to, in combination with, or instead of the recycled/waste cellulose fibers. Further, in some aspects, the cellulose fibers from all or part of the fiber source 150 may not necessarily be required to be free of contaminants, as long as those contaminants can be processed along with the cellulose fibers to form the fiber mixture. For example, where the source of cellulose fibers includes waste pizza boxes, those waste pizza boxes do not necessarily need to be free of pizza components, such as cheese, in order for those pizza boxes to be processed by the first processing device 200. As such, a decontamination process may not necessarily be contemplated (e.g., for either or both of the cellulose fibers and the fiber mixture), but could be included, should there be a need or desire for a contaminant-free cellulose product.

In addition, the cellulose fibers from all or part of the fiber source 150 do not necessarily need to be dry prior to being processed by the first processing device 200. That is, waste sources of cellulose fibers may be, in some instances, in the form of bales, wherein the bales may often be exposed to the elements (i.e., rain or condensation) prior to being introduced to the first processing device 200. In other instances, the waste sources of cellulose fibers may be, for example, empty fruit bunches removed from palm trees and which may be stored outdoors, in a high humidity environment, or in areas otherwise exposed to the elements. In those instances, aspects of the present disclosure, such as the first processing device 200, are also configured to process the "wet" source of cellulose fibers into the fiber mixture. In this regard, the cellulose fibers may be processed by the first processing device 200, regardless of the moisture level present therein, into the fiber mixture. However, in some instances, such processing may be facilitated by reduction of the moisture level in the source 150 via an appropriate moisture-reducing device 125. For example, in some instances, empty fruit bunches may include a moisture content on the level of about 80%, which may make initial handling difficult. In such instances, the moisture content may be reduced in various manners, or the empty fruit bunches otherwise de-liquefied, to facilitate material handling, though the moisture content may not necessarily be required to be reduced to 0%. Further, the extent of the processing of the cellulose fibers by the first processing device 200 may vary considerably depending, for example, on the level of refinement (i.e., coarse/fine) desired of the final cellulose product 750. For example, the cellulose fibers may be separated, deflocculated, chipped, shredded, ground, fibrated, fiberized, particulated, or otherwise processed by the first processing device 200, whether homogenously or heterogeneously, to form the fiber mixture 225. As such, the first processing device 200 may be any machine suitable for deconstructing the cellulose fibers in the manner discussed, wherein one such exemplary machine may be a heatable hammer mill manufactured by Siempelkamp of Krefeld, Germany.

Once the cellulose fibers are produced or otherwise processed into the desired state for the fiber mixture 225 by the first processing device 200, the fiber mixture 225 may then be directed to the first mixing device 300, where the fiber mixture 225 is mixed with a fire-retarding solution 250 to form a wetted mixture 275. The first mixing device 300 may be further configured to mix the fiber mixture 225 with the fire-retarding solution 250 such that the fire-retarding solution 250 is substantially uniformly distributed through the fiber mixture 225. In some instances, the fire-retarding solution 250 may have a particular solids content, and the first mixing device 300 may be further configured to mix the fiber mixture with the fire-retarding solution 250 such that the wetted mixture 275 has the solids content of the fire-retarding solution 250 substantially uniformly and thoroughly dispersed therethrough. In forming the wetted mixture 275, the first mixing device 300 may be configured to substantially saturate the fiber mixture 225 with the fire-retarding solution 250, wherein the fire-retarding solution 250 has a first concentration of the particular solids content, and/or the first mixing device 300 may be configured to form a slurry from the fiber mixture 225 and the fire-retarding solution 250. In some instances, the first mixing device 300 may also be configured to add water and/or other appropriate liquid or chemical to the fiber mixture 225 and fire-retarding solution 250 to form the slurry.

In particular aspects, the fire-retarding solution 250 may be an aqueous fire-retarding solution. It may be preferred that the fire-retarding solution be nontoxic and/or have a neutral pH and/or be hypoallergenic and/or have any number of otherwise desirable properties affecting human/animal and/or environmental safety, while maintaining the necessary efficacy, as implemented and upon exposure to heat and/or flame. In some aspects, the fire-retarding solution 250 may include a component which, standing alone, may not necessarily exhibit one or more of the previously-disclosed preferred or desirable properties. However, one skilled in the art will appreciate that other different components of the fire-retarding solution 250 may interact with the noted component so as to neutralize, minimize, or otherwise eliminate, chemically or otherwise, the non-preferred or undesirable properties of the noted component such that the overall fire-retarding solution 250 exhibits one or more of the preferred or desirable properties. In some other aspects, the fire-retarding solution 250 may comprise any one of a boron compound, a borate, an inorganic hydrate, a bromine compound, aluminum hydroxide, magnesium hydroxide, hydromagnesite, antimony trioxide, a phosphonium salt, ammonium phosphate, and diammonium phosphate, or various combinations thereof. In this regard, one skilled in the art will appreciate that various fire-retarding or fire resistant substances, either currently known or later developed or discovered, may be applicable to the disclosed processes and apparatuses herein within the scope of the present disclosure.

One skilled in the art will further appreciate that the fire-retarding solution 250 may be formed by adding a solid fire-retardant product to a liquid (i.e., water) or other chemical mixed with the fiber mixture such that the solid fire-retardant product forms a solution with the liquid or other chemical comprising the slurry with the fiber mixture 225. In other instances, the solution formed from the solid fire-retardant product and the liquid or other chemical may be used to form the wetted mixture 275 with the fiber mixture 225. In some aspects, the first mixing device 300 may be configured to agitate the slurry or wetted mixture, so as to substantially uniformly distribute the fire-retarding solution therethrough. In other aspects, the first mixing device 300 may be configured to manipulate the wetted mixture 275, such that the solids content of the fire-retarding solution is substantially uniformly and thoroughly dispersed through the wetted mixture. The first mixing device 300 may be any machine suitable for forming the wetted mixture and/or the slurry from the fiber mixture and the fire-retarding solution, in the various manners discussed, wherein one such exemplary machine may be manufactured by Siempelkamp of Krefeld, Germany.

In some aspects, once the wetted mixture 275 is formed by the first mixing device 300, a second mixing device 400 may be configured to receive the wetted mixture 275 and to form a cohesive mixture 325 from the wetted mixture 275 and a binding agent 260 added thereto. Such a binding agent 260 may comprise, for example, a resin material or an adhesive material. In one particular example, the binding agent 260 may comprise methylene dipenyl diisocyanate (MDI). However, one skilled in the art will appreciate that the binding agent 260 may vary considerably, as appropriate, and may comprise other suitable materials such as, for instance, urea formaldehyde (UF) or phenol formaldehyde (PF). In some instances, the first mixing device 300 may be configured to form the wetted mixture 275 prior to the second mixing device 400 forming the cohesive mixture 325. In other instances, the first and second mixing devices 300, 400 may be configured to form the wetted mixture 275 and the cohesive mixture 325 substantially concurrently (i.e., adding the fire-retarding solution to the fiber mixture substantially concurrently with adding the binding agent).

In some particular aspects, a second processing device 500 may be provided to de-liquefy the wetted mixture 275, to form a dry fire-retarding fiber mixture, prior to the formation of the cohesive mixture 325 in the second mixing device 400. In such instances, the second mixing device 400 may be configured to form the cohesive mixture 325 from the dry fire-retarding fiber mixture and a binding agent 260, as previously disclosed. The second processing device 500, such as a dryer, may thus be provided, as necessary and as will be appreciated by one skilled in the art, to process the wetted mixture 275 to form the dry fire-retarding fiber mixture. The second processing device 500 may be configured to apply heat to the wetted mixture 275, for example, via heated air (i.e., air heated with combusted natural gas or other suitable fuel source), or through any of a variety of heating/drying methods, such as, for example, microwave or infrared drying techniques, as will be appreciated by one skilled in the art.

In instances where the first mixing device 300 is configured to form a slurry from the fiber mixture and the fire-retarding solution, the second processing device 500 may be configured to dewater the slurry, before drying the dewatered slurry to form the dry fire-retarding fiber mixture. Such a dewatering process may be accomplished, for example, by a suitably modified Fourdrinier-type machine, or other appropriate process, as will be appreciated by one skilled in the art. The slurry may also be dewatered, for instance, using a twin wire forming section and/or appropriate screening devices. Further, as previously disclosed, in order to dry the dewatered slurry, the second processing device 500 may be configured to apply heat to the wetted mixture, for example, via heated air (i.e., air heated with combusted natural gas or other suitable fuel source), or through any of a variety of heating/drying methods, such as, for example, microwave or infrared drying techniques, as will be appreciated by one skilled in the art. One skilled in the art will also appreciate that the second processing device 500 may be configured in many different manners. For example, a suitably-configured screen device may be configured to receive the slurry, wherein the screen device may include a number of perforations. Once deposited in the screen device, the slurry may be engaged by an opposing platen, which may also be perforated. The perforations may serve to dewater the slurry, while the platen and/or the screen device may be heated to provide for drying of the dewatered slurry.

In other aspects, the apparatus 100 may also comprise a recovery device 600 configured to recover excess fire-retarding solution, in one of a liquid and a vapor form, upon the second processing device 500 de-liquefying the wetted mixture 275. In some instances, the recovery device 600 may also be configured to engage the first mixing device 300 for accomplishing the recovery of the excess fire-retarding solution. That is, the recovery device 600 may be configured to direct the recovered excess fire-retarding solution, removed from the wetted mixture upon de-liquefication thereof by the second processing device 500, to the mixing device 300, for example, in a closed-loop, fire-retarding solution recycling process. Upon recovery of the excess portions, including liquids and vapors, by the recovery device 600, the recovered excess fire-retarding solution may be strained, filtered, or otherwise purified, and then reintroduced to the first mixing device 300 to form subsequent portions of the wetted mixture 275, such that the fire-retarding solution is substantially or entirely prevented from leaving the apparatus 100 as a waste product.

In some aspects, the second processing device 500 may be configured to de-liquefy the wetted mixture 275 such that the moisture content is substantially 0%. However, upon exposure to atmosphere, the now dry fire-retarding fiber mixture may absorb moisture from atmospheric humidity. As such, the dry fire-retarding fiber mixture may typically exhibit some moisture content (i.e., about 1% to about 3%). In this regard, some binding agents, such as MDI, may require a particular amount of moisture present to actuate or otherwise enhance the binding properties thereof. Accordingly, prior to the second mixing device 400 forming the cohesive mixture, the second mixing device 400 and/or the second processing device 500 may be configured to add moisture to the dry fire-retarding fiber mixture. Sufficient moisture may thus be added to the dry fire-retarding fiber mixture, as necessary or desired, such that the overall moisture content in the dry fire-retarding fiber mixture is between about 1% and about 20%. In some aspects, the added moisture content may serve to displace at least some of the solids content of the fire-retarding solution from the surfaces of the cellulose fibers, or cells associated therewith, so as to facilitate and enhance interaction between the binding agent and the surfaces of the cellulose fibers and/or associated cells.

In other aspects, a conditioning device 700 may be provided, wherein such a conditioning device 700 may be configured to receive the wetted mixture 275 and to maintain the wetted mixture 275 for at least a predetermined time, so as to allow the fire-retarding solution to be at least partially absorbed by the cellulose fibers in the fiber mixture, prior to the second mixing device 400 forming the cohesive mixture 325 therefrom, or prior to the second processing device 500 de-liquefying the wetted mixture 275. In some instances, the first mixing device 300 and/or the second mixing device 400 may be configured to serve as the conditioning device 700, as necessary or desired. In some aspects, maintaining the wetted mixture 275 for the predetermined time such as, for example, for about 1 minute, or 1 hour, or more, may allow more of the solids content of the fire-retarding solution to be absorbed by the cellulose fibers, and therefore enhance the fire-retarding properties thereof. In addition, the increased absorption of the solids content of the fire-retarding solution by the cellulose fibers may result in less of the solids content remaining on the surfaces of the cellulose fibers and, in turn, may facilitate or enhance the interaction between the binding agent and the surfaces of the cellulose fibers.

Once the cohesive mixture 325 is formed, a forming device 800 may be implemented to form the cohesive mixture into a formed cellulose product 750. For example, the forming device 800 may be configured to form the cohesive mixture 325 into the formed cellulose product 750 by compressing the cohesive mixture to form a densified cellulose product, extruding the cohesive mixture to form the formed cellulose product, and/or molding the cohesive mixture to form the formed cellulose product. The formed cellulose product 750 may, in some instances, be characterized as, for example, an oriented strand board cellulose product, a medium density fiber board cellulose product, a particle board cellulose product, and/or an insulation board cellulose product.

In some aspects, the cellulose product 750 may be formed as a sheet having a desired length, width, and thickness, or as a continuous sheet that is later subdivided into segments of a desired length. In some instances, the forming device 800 may be configured to engage the cohesive mixture with one of a negative die and a positive die, so as to form a cellulose product having a surface defining a negative impression of the one of the negative die and the positive die. That is, for example, various platen may be appropriately patterned with a raised and/or depressed pattern such that the formed cellulose product will have a corresponding surface defining a negative impression of the pattern. One skilled in the art will also appreciate that the capability of manipulating the cohesive mixture in this manner indicates that the final form of the cellulose product need not necessarily be in planar form, but may take many different shapes, contours, and sizes in addition to that disclosed herein.

In yet another aspect, it may be advantageous to be able to evaluate the formed cellulose product in order to determine or monitor the characteristics thereof such that the forming process can be altered, as necessary, to provide a particular formed cellulose product, as necessary or desired. For example, in one instance, the apparatus 100 may further include an evaluation device 900 configured to evaluate an internal bond strength of the formed cellulose product. One skilled in the art will appreciate that such an evaluation device 900 may comprise a tensile strength testing device or other suitable device having members capable of being affixed to opposing surfaces of a specimen of the formed cellulose product 750, wherein the failure of the specimen in tension provides an indication of the internal bond strength of the formed cellulose product. In such instances, a comparator device 950 may be configured to compare the evaluated internal bond strength to an acceptable internal bond strength for the formed cellulose product, wherein the acceptable internal bond strength may vary, as necessary or desired. If the evaluated internal bond strength is less than the acceptable internal bond strength, one possible resolution may involve, for example, implementing a dilution device 1000 to dilute the fire-retarding solution 250 used by the first mixing device 300 to form the wetted mixture to a second concentration of the solids content thereof, with the second concentration being less than the first concentration, to enhance the internal bond strength of the formed cellulose product 750. Diluting the fire-retarding solution in this manner may, in some instances, promote or otherwise facilitate the uniform and thorough dispersion of the solids content through the wetted mixture, absorption of the solids content by the cellulose fibers, and/or lessening of the solids content on the surfaces of the cellulose fibers. In other aspects, if the evaluated internal bond strength is less than the acceptable internal bond strength, another possible resolution may involve, for example, implementing a binding agent adjustment device 1050 configured to increase an amount of the binding agent used to form the cohesive mixture 325. Increasing the amount of the binding agent may thus increase the cohesiveness of the cellulose fibers within the cohesive mixture, and thereby enhance the internal bond strength of the formed cellulose product.

In this regard, other factors such as, for instance, maintaining the wetted mixture for a particular time prior to de-liquefying the wetted mixture or forming the cohesive mixture, as well as wetting the dry fire-retarding fiber mixture prior to forming the cohesive mixture, may also facilitate enhancement of the internal bond strength of the formed cellulose product. In some instances, any enhancement of the internal bond strength may also be reflected in other characteristics of the formed cellulose product. For example, enhancement of the internal bond strength (IB) may also be accompanied by enhancements in density, modulus of rupture (MOR), and/or modulus of elasticity (MOE).

In one particular example, a formed cellulose product, in the form of a fiber board, was formed from empty fruit bunch fibers, the empty fruit bunches being first loosened in a heated hammer mill and dried to a moisture content of about 10%. The resulting fiber mixture was then wetted with a fire-retarding solution including diammonium phosphate as an active ingredient.

The wetted fiber mixture was then maintained for a period of about one hour before being resonated with an isocyanate binding agent (MDI) and the fibers then loosened again in an unheated hammer mill. The cohesive mixture was then wetted with water prior to being pressed into the fiber board comprising the formed cellulose product. The cohesive mixture was characterized as having about 10% of the fire-retarding solution and about 18% of the binding agent (MDI). The resulting fiber board exhibited a density of 905 kg/m$^3$, an MOR of 34.3 N/mm$^2$, an MOE of 3341 N/mm$^2$, an IB of 3.03 N/mm$^2$, and a thickness swell (upon exposure to water) of 5.9%. In comparison, a typical MDF type general purpose board for use in dry conditions is required to have an IB of 0.55 N/mm$^2$, an MOR of 20 N/mm$^2$, an MOE of 2200 N/mm$^2$ and a thickness swell of less than 12% As a further comparison, a Class 4 OSB type board for heavy-duty load bearing applications in humid conditions is required to have an IB of 0.45 N/mm$^2$, an MOR of between 15 N/mm$^2$ and 28 N/mm$^2$ (average of 21.5 N/mm$^2$), an MOE of between 1900 N/mm$^2$ and 4800 N/mm$^2$ (average of 3350 N/mm$^2$), and a thickness swell of less than 12%.

Further, in some instances, the cellulose product formed in accordance with aspects of the present disclosure, such as the empty fruit bunch fiber board product previously noted, may also exhibit other desirable and enhanced properties over those of conventional fiber board products. For example, such cellulose products may exhibit "zero ignition" and/or "zero flame spread," when treated with the fire-retarding solution (i.e., as opposed to merely controlling flame spread, as in the case of a surface treatment of a product with a fire retardant). In another example, treatment of the fiber mixture with the fire-retarding solution may provide a more uniform and thorough dispersion and distribution of the fire-retarding solution within the formed cellulose product, thus enhancing fire resistance (flame spread), as well as thermal barrier (thermal resistance/insulation) and/or other characteristics.

Many modifications and other aspects of the disclosures set forth herein will come to mind to one skilled in the art to which these disclosures pertain having the benefit of the teachings presented in the foregoing descriptions and the associated drawings. For example, one skilled in the art that the apparatuses disclosed herein readily lead to associated processes and methods for forming a fire resistant cellulose product, as shown, for example, in FIG. 2. More particularly, such methods may comprise processing cellulose fibers into a fiber mixture (block 1100), and forming a wetted mixture from the fiber mixture and a fire-retarding solution, wherein the slurry has the fire-retarding solution substantially uniformly distributed therethrough (block 1200), forming a cohesive mixture from the wetted mixture and a binding agent (block 1300), and then forming the cohesive mixture into a cellulose product (block 1400).

In addition, in some instances, the as-formed cellulose product may be further processed, for example, to planarize certain surfaces thereof, or to remove "broke" or otherwise planarize the edges of the cellulose product. In such instances, the apparatus 100 may also include a collection device (not shown), wherein the collection device may be configured to capture waste solids from the post-formation processing of the cellulose product. In those instances, the captured waste solids may be incorporated into other products (i.e., blown-in insulation) while providing fire-resistance properties therefor, or recycled through inclusion in the cellulose fibers forming the fiber mixture.

Still further, in some instances, the first mixing device 300 may be configured to add and/or receive other appropriate substances/materials/chemicals for addition to the fiber mixture. For example, the first mixing device 300 may be configured to receive a mold inhibitor; a water repellant, waterproofing, or otherwise water resistant substance; and/or an insect-deterrent such as glass particles, glass fibers, glass slivers, glass shards, or any other suitable forms of glass elements, and/or a borate substance, so as to provide a termite deterrent. In any instance, it may be preferable that any additional substances received into the fiber mixture be suitably processed by the first mixing device 300 so as to be substantially uniformly and thoroughly distributed and dispersed within the fiber mixture.

Further, one skilled in the art will appreciate that, in some aspects, the cohesive mixture may be generally prepared, and can then be formed, molded, or otherwise manipulated into various end products such as, for example, boards, compounded roofing shingles, compounded roofing shakes, compounded sidewall shingles, compounded Spanish style "red clay" type roof tiles, electrical outlet encasements, doors, interior wall planking, exterior sheathing, cabinetry cores, cupboards, compounded cabinet door faces, flooring, laminated flooring, veneered compounded flooring, or the like. However, the exemplary end products presented herein are not intended to be limiting in any manner with respect to the wide variety of contemplated end products. Thus, the general cohesive material concept may be extend to instances where the end product may be produced in many different manners such as, for example, by molding, extrusion, pressing, stamping, or by any other suitable production method.

Moreover, the general cohesive material may be provided as a component or other portion of a further end assembly, in such previous examples as laminated flooring and cored cabinetry. One skilled in the art will thus appreciate that formed cellulose products in accordance with aspects of the present disclosure may be produced such that the fire-retarding solution is dispersed at least partially, if not consistently and uniformly, throughout. As such, the components of the end assembly comprising the fire-retarded cellulose product may likely be wholly resistant to fire and/or unable to ignite on a more permanent basis (i.e., since the fire-retarding solution is effectively integrated into the cellulose product), as compared to simple surface treatments that may be easily removed, washed away, or subject to degradation over time.

Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of forming a fire resistant cellulose material, said method comprising:
   processing cellulose fibers into a deconstructed fiber mixture;
   forming a wetted mixture from the deconstructed fiber mixture and a fire-retarding solution, the wetted mixture having a solids content of the fire-retarding solution substantially uniformly and thoroughly dispersed therethrough;
   de-liquefying the wetted mixture to form a dry fire-retarding deconstructed fiber mixture having a moisture content of between 0% and about 3%; applying a binding agent to the dry fire-retarding deconstructed fiber mixture; and
   applying compression to the dry fire-retarding deconstructed fiber mixture having the binding agent applied thereto such that the binding agent binds together the fibers within the dry-fire-retarding deconstructed fiber mixture to form a solid formed cellulose product.

2. A method according to claim 1 further comprising de-liquefying one of the cellulose fibers and the deconstructed fiber mixture, prior to forming the wetted mixture.

3. A method according to claim 1, wherein processing cellulose fibers and forming a wetted mixture further comprise processing cellulose fibers and forming the wetted mixture, without de-contaminating one of the cellulose fibers and the deconstructed fiber mixture.

4. A method according to claim 1, further comprising maintaining the wetted mixture for at least a predetermined time, so as to allow the fire-retarding solution to be at least partially absorbed by the cellulose fibers in the deconstructed fiber mixture, prior to de-liquefying the wetted mixture.

5. A method according to claim 1, further comprising adding moisture to the dry fire-retarding deconstructed fiber mixture, such that the dry fire-retarding deconstructed fiber mixture has a moisture content of between about 1% and about 20%, prior to applying the binding agent to the dry fire-retarding deconstructed fiber mixture.

6. A method according to claim 1, wherein processing cellulose fibers into a deconstructed fiber mixture further comprises processing one of raw wood pulp, palm tree waste, sugar cane waste, waste fiber, waste paper, and waste board, each comprising cellulose fibers, into the deconstructed fiber mixture.

7. A method according to claim 1, wherein forming a wetted mixture further comprises one of substantially saturating the deconstructed fiber mixture with the fire-retarding solution, the fire-retarding solution having a first concentration of the solids content, and forming a slurry from the deconstructed fiber mixture and the fire-retarding solution.

8. A method according to claim 1, wherein forming a wetted mixture further comprises forming a wetted mixture from the deconstructed fiber mixture and a fire-retarding solution comprising one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

9. A method according to claim 1, wherein de-liquefying the wetted mixture to form a dry fire-retarding deconstructed fiber mixture further comprises:
   dewatering the wetted mixture; and
   drying the dewatered wetted mixture to form the dry fire-retarding deconstructed fiber mixture having moisture content of between 0% and about 3%.

10. A method according to claim 1, wherein de-liquefying the wetted mixture to form a dry fire-retarding deconstructed fiber mixture further comprises heating the wetted mixture to form the dry fire-retarding deconstructed fiber mixture.

11. A method according to claim 1, further comprising:
    recovering excess fire-retarding solution, in one of a liquid and a vapor form, upon de-liquefying a first portion of the wetted mixture to form the dry fire-retarding deconstructed fiber mixture; and
    adding the recovered excess fire-retarding solution to a subsequent portion of the deconstructed fiber mixture to form a subsequent portion of the wetted mixture.

12. A method according to claim 1, wherein forming a wetted mixture further comprises forming a wetted mixture from the deconstructed fiber mixture and one of an aqueous fire-retarding solution, a nontoxic liquid fire-retarding solution, and a neutral pH liquid fire-retarding solution.

13. A method according to claim 1, wherein applying a binding agent to the dry fire-retarding deconstructed fiber mixture further comprises applying a binding agent comprising one of a resin material and an adhesive material to the dry fire-retarding deconstructed fiber mixture.

14. A method according to claim 1, wherein applying compression to the dry fire-retarding deconstructed fiber mixture having the binding agent applied thereto further comprises one of compressing the dry fire-retarding deconstructed fiber mixture having the binding agent applied thereto to form a densified cellulose product, extruding the dry fire-retarding deconstructed fiber mixture having the binding agent applied thereto to form the formed cellulose product, and molding the dry fire-retarding deconstructed fiber mixture having the binding agent applied thereto to form the solid formed cellulose product.

15. A method according to claim 1, wherein applying compression to the dry fire-retarding deconstructed fiber mixture having the binding agent applied thereto to form a solid formed cellulose product further comprises applying compression and heat to the dry fire-retarding deconstructed fiber mixture having the binding agent applied thereto to form a solid formed cellulose product comprising one of an oriented strand board cellulose product, a medium density fiber board cellulose product, a particle board cellulose product, and an insulation board cellulose product.

16. A method according to claim 7, further comprising:

evaluating an internal bond strength of the solid formed cellulose product using a tensile strength testing device;

comparing the evaluated internal bond strength to an acceptable internal bond strength for the solid formed cellulose product; and diluting the fire-retarding solution used to form a subsequent portion of the wetted mixture to such that the fire-retarding solution includes a second concentration of the solids content, the second concentration being less than the first concentration of the solids content, if the evaluated internal bond strength is less than the acceptable internal bond strength.

17. A method according to claim 1, further comprising:

evaluating an internal bond strength of the solid formed cellulose product using a tensile strength testing device;

comparing the evaluated internal bond strength to an acceptable internal bond strength for the solid formed cellulose product; and increasing an amount of the binding agent applied to a subsequent portion of the dry fire-retarding deconstructed fiber mixture, if the evaluated internal bond strength is less than the acceptable internal bond strength.

* * * * *